US007218820B2

(12) United States Patent
Maida, Jr.

(10) Patent No.: US 7,218,820 B2
(45) Date of Patent: May 15, 2007

(54) METHOD AND SYSTEM FOR PROVIDING A HYDROGEN DIFFUSION BARRIER FOR FIBER OPTIC CABLES USED IN HOSTILE ENVIRONMENTS

(75) Inventor: John L. Maida, Jr., Houston, TX (US)

(73) Assignee: WellDynamics, Inc., Spring, TX (US)

(*) Notice: Subject to any disclaimer, the term of this patent is extended or adjusted under 35 U.S.C. 154(b) by 210 days.

(21) Appl. No.: 11/107,675

(22) Filed: Apr. 14, 2005

(65) Prior Publication Data

US 2006/0018611 A1 Jan. 26, 2006

Related U.S. Application Data

(63) Continuation-in-part of application No. 11/090,656, filed on Mar. 25, 2005, and a continuation-in-part of application No. 10/896,387, filed on Jul. 22, 2004, now Pat. No. 6,907,170.

(51) Int. Cl.
*G02B 6/44* (2006.01)

(52) U.S. Cl. ...................... 385/100; 385/102; 385/123; 385/127; 385/128; 385/141

(58) Field of Classification Search ................ 385/100, 385/102, 123, 127, 128, 141, 104
See application file for complete search history.

(56) References Cited

U.S. PATENT DOCUMENTS 4,696,543 A 9/1987 Pitt et al. ................. 350/96.23
5,140,664 A 8/1992 Posisio et al. .............. 385/109
5,857,255 A 1/1999 Wichmann .................... 29/458
5,892,176 A 4/1999 Findlay et al. .............. 174/115
5,896,482 A 4/1999 Blee et al. .................. 385/107
6,116,578 A 9/2000 Pruett ....................... 252/134.4
6,130,981 A 10/2000 Nelson et al. .............. 385/128
6,201,917 B1 * 3/2001 Campion et al. ........... 385/123
6,220,059 B1 4/2001 Klein et al. .................... 65/394
6,258,404 B1 7/2001 Morgand et al. ......... 427/163.2

(Continued)

FOREIGN PATENT DOCUMENTS

EP 0 163 401 A2 4/1985

(Continued)

OTHER PUBLICATIONS

Advertisement, "Downhole Optical Cable," Weatherford International Ltd., 2 pages, © 2003.

(Continued)

*Primary Examiner*—Brian M. Healy
(74) *Attorney, Agent, or Firm*—Smith IP Services, P.C.

(57) ABSTRACT

A fiber optic conduit for use in a hostile environment includes a hydrogen barrier shell that is disposed outwardly from an inner axial tube. The hydrogen barrier shell comprises a material that is capable of reducing hydrogen permeation through the fiber optic conduit and a thickness of at least approximately one-thousandth of an inch. The inner axial tube is operable to receive one or more optical fibers. The conduit further includes an outer axial tube that is disposed outwardly from the hydrogen barrier shell and is operable to form a hydrostatic pressure boundary for the fiber optic conduit.

20 Claims, 4 Drawing Sheets

U.S. PATENT DOCUMENTS

| | | | | |
|---|---|---|---|---|
| 6,343,173 | B2 | 1/2002 | Hordvik et al. | 385/102 |
| 6,404,961 | B1 | 6/2002 | Bonja et al. | 385/109 |
| 6,438,999 | B1 | 8/2002 | Antos et al. | 65/399 |
| 6,475,620 | B1 | 11/2002 | Ruello et al. | 428/392 |
| 6,496,625 | B1 | 12/2002 | Falkowich et al. | 385/100 |
| 6,557,630 | B2 | 5/2003 | Harkins et al. | 166/250.01 |
| 6,597,850 | B2 | 7/2003 | Andrieu et al. | 385/128 |
| 6,614,970 | B2 | 9/2003 | Bonicel | 385/109 |
| 6,685,361 | B1 | 2/2004 | Rubino et al. | 385/58 |
| 6,690,866 | B2 | 2/2004 | Bonja et al. | 385/109 |
| 6,751,556 | B2 | 6/2004 | Schroeder et al. | 702/6 |
| 7,082,239 | B2 * | 7/2006 | Kuczma et al. | 385/100 |
| 2002/0006260 | A1 * | 1/2002 | Orcel et al. | 385/128 |
| 2004/0258371 | A1 | 12/2004 | Kuczma et al. | 385/100 |

FOREIGN PATENT DOCUMENTS

| | | |
|---|---|---|
| GB | 2402231 A | 12/2004 |
| WO | WO 96/15466 | 5/1996 |
| WO | WO 00/05612 | 2/2000 |
| WO | WO 2006/019476 A2 | 2/2006 |

OTHER PUBLICATIONS

PCT/US2006/013810, Notification of Transmittal of the International Search Report and the Written Opinion of the International Searching Authority, or the Declaration, 10 pages, Aug. 10, 2006.

PCT/US2006/005593, Notification of Transmittal of the International Search Report and the Written Opinion of the International Searching Authority, or the Declaration, 14 pages, Nov. 10, 2006.

AFL Telecommunications, "CentraCore OPT-GW," Fiber Optic Cable white paper, a Fujikura Business, www.AFLtele.com, 1 page, © 2002.

PCT, International Searching Authority, 5 pages, Dec. 22, 2005.

* cited by examiner

METHOD AND SYSTEM FOR PROVIDING A HYDROGEN DIFFUSION BARRIER FOR FIBER OPTIC CABLES USED IN HOSTILE ENVIRONMENTS

RELATED APPLICATIONS

This application is a continuation-in-part of application Ser. No. 10/896,387, entitled "Hydrogen Diffusion Delay Barrier for Fiber Optic Cables Used in Hostile Environments," filed on Jul. 22, 2004, now U.S. Pat. No. 6,907,170; and a continuation-in-part of application Ser. No. 11/090,656, pending, entitled "Method and Apparatus for Providing a Hydrogen Diffusion Barrier for Fiber Optic Cables used in Hostile Environments," filed Mar. 25, 2005.

TECHNICAL FIELD OF THE INVENTION

This invention relates in general to fiber optic cables, and more particularly, to a system and method for reducing the effects of hydrogen diffusion and/or radiation degradation in fiber optic cables used in hostile environments.

Overview

Fiber optic cables used in hostile environments, such as those found "under-sea" in telecommunications systems and/or "down-hole" in oil and gas wells, provide a critical link between sensors within the hostile environment and instrumentation outside the environment. In some oil and gas applications, the environment in a down-hole well can include relatively high temperatures, high vibration, corrosive chemistries, and/or the presence of hydrogen. In other oil and gas applications, the environment in a down-hole well can also include X-rays, gamma-rays, or other forms a radiation. Using conventional fiber optic cables in down-hole environments having relatively high temperatures, the presence of hydrogen, and/or the presence of radiation often results in degradation of the fiber optic cable. In most cases, degradation of the fiber optic cable can reduce the normal life expectancy of the optical fibers within the cable. Moreover, degradation of the fiber optic cable typically reduces the optical performance of the optical fibers.

SUMMARY OF EXAMPLE EMBODIMENTS

In one embodiment, a fiber optic conduit for use in a hostile environment comprises a hydrogen barrier shell that is disposed outwardly from an inner axial tube. The hydrogen barrier shell comprises a material that is capable of reducing hydrogen permeation through the fiber optic conduit and a thickness of at least approximately one-thousandth of an inch. The inner axial tube is operable to receive one or more optical fibers. The conduit further comprises an outer axial tube that is disposed outwardly from the hydrogen barrier shell and is operable to form a hydrostatic pressure boundary for the fiber optic conduit.

In another embodiment, a fiber optic conduit for use in a hostile environment comprises a hydrogen barrier shell that is disposed outwardly from an inner axial tube. The hydrogen barrier shell comprises a material that is capable of reducing hydrogen permeation through the fiber optic conduit and is operable to form a cylindrical covering substantially around an outer surface of the inner axial tube. In one particular embodiment, at least a portion of the hydrogen barrier shell adheres to at least a portion of the inner axial tube through an interference fit. The conduit further comprises an outer axial tube that is disposed outwardly from the hydrogen barrier shell and is operable to form a hydrostatic pressure boundary for the fiber optic conduit.

According to one exemplary method of forming the present invention, a method of forming a fiber optic conduit capable of being used in a hostile environment comprises forming a hydrogen barrier shell. The hydrogen barrier shell is disposed outwardly from an inner axial tube that is operable to receive one or more optical fibers. The hydrogen barrier shell comprises a material that is capable of reducing hydrogen permeation through the fiber optic conduit and a thickness of at least approximately one-thousandth of an inch. The method also comprises forming an outer axial tube that is disposed outwardly from the hydrogen barrier shell and is operable to form a hydrostatic pressure boundary for the fiber optic conduit.

Depending on the specific features implemented, particular embodiments of the present invention may exhibit some, none, or all of the following technical advantages. Various embodiments may be capable of reducing and/or slowing the deleterious effects of hydrogen and/or radiation on fiber optic cables. Some embodiments may be capable of generating a relatively robust hydrogen and/or radiation barrier within a fiber optic conduit that is capable of receiving one or more optical fibers.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

FIGS. 1A through 1D are cross-sectional views showing one example of a method of forming one embodiment of a fiber optic cable 100 for use in a hostile environment. Particular examples and dimensions specified throughout this document are intended for exemplary purposes only, and are not intended to limit the scope of the present disclosure. Moreover, the illustrations in FIGS. 1A through 1D, FIGS. 2A through 2C, FIGS. 3A through 3C, and FIG. 4 are not intended to be to scale.

In various embodiments, one or more optical fibers within fiber optic cable 100 can be used as a distributed sensor within the hostile environment. That is, one or more optical fibers within optical cable 100 may be capable of, for example, sensing a temperature profile, a strain profile, or a combination of these or other parameters. In other embodiments, fiber optic cable 100 can be used to communicate data from sensors within a hostile environment to instrumentation outside the environment.

In one particular embodiment, fiber optic cable 100 communicates data from sensors within a down-hole oil or gas well to instrumentation outside the down-hole well. In that embodiment, the down-hole oil or gas well environment typically includes the presence of hydrogen, relatively high temperatures, and/or corrosive chemistries. In most cases, the relatively high temperature of the down-hole environment can be, for example, at least 30° C., at least 100° C., at least 150° C., or more. In some embodiments, the down-hole oil or gas well environment may also include one or more radiation sources, such as, a pulse neutron generator, a gamma ray tool, or a combination of these or other radiation sources. In other embodiments, fiber optic cable 100 is capable of being used in a sub-sea environment that includes the presence of hydrogen.

One aspect of this disclosure recognizes that forming a hydrogen barrier shell within fiber optic cable 100 can alleviate some of the problems conventionally associated with the use of fiber optical cable 100 in hostile environments. In particular, forming a hydrogen barrier within fiber optic cable 100 can minimize and/or delay the deleterious effects of hydrogen on the optical fibers used in hostile environments, such as those found in the down-hole oil or gas well industry and/or the under-sea telecommunications industry. Moreover, forming a barrier shell within a fiber optical conduit can minimize and/or delay the deleterious effects of ionizing radiation on the optical fibers used in the hostile environments.

Figure 1A:
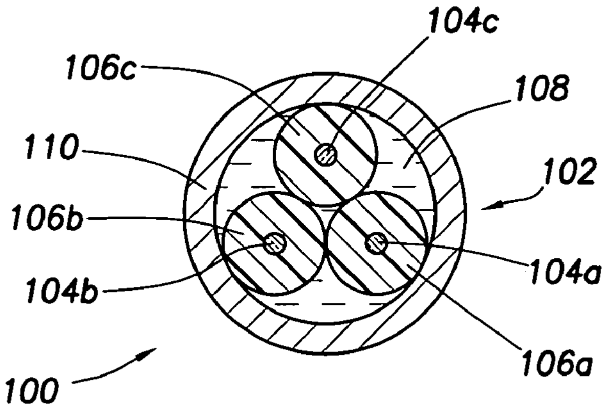
FIGS. 1A through 1D are cross-sectional views showing one example of a method of forming one embodiment of a fiber optic cable for use in a hostile environment.

FIG. 1A shows a cross-sectional view of a fiber optic cable 100 after formation of a fiber in metal tube core 102. Forming core 102 may be effected through any of a variety of standard fiber optic cable manufacturing techniques. In this example, core 102 includes three optical fibers 104*a*–104*c* disposed inwardly from an inner axial tube 110. Although this example includes three optical fibers 104, any number of optical fibers 104 may be used without departing from the scope of the present disclosure. Optical fibers 104*a*–104*c* can comprise, for example, a single mode optical fiber, a multi-mode optical fiber, or a combination of these or other fiber types. In one particular example, optical fibers 104*a* and 104*b* comprise 50/125 μm Graded Index Multi-Mode fibers manufactured by SUMITOMO and optical fiber 104*c* comprises 10/125 μm Pure Core Step Index Single-Mode fiber manufactured by SUMITOMO.

Inner axial tube 110 can comprise, for example, Stainless Steel, Inconel, Incoloy, or any other corrosion resistant metal alloy. In this particular example, inner axial tube 110 comprise a Stainless Steel micro-tube having approximately 1/16-inch outer diameter and a 0.005-inch wall thickness. Although this example includes an outer diameter of 1/16-inch and a wall thickness of 0.005-inches, any other selected outer diameter and wall thickness may be used without departing from the scope of the present disclosure. The selected diameter and wall thickness of inner axial tube 110 may vary depending upon the materials used and the number of optical fibers 104. Moreover, the selected diameter and wall thickness of inner axial tube 110 may vary throughout the length of fiber optic cable 100. In other embodiments, inner axial tube 110 can comprise a high strength and/or high temperature polymer, such as, for example, a carbon based polymer, a polyimide, or other suitable epoxy or polymer. In those embodiments, the high strength and/or high temperature polymer should have a thickness capable of providing pressure integrity for any pressure formed within cable 100.

Fiber in metal tube core 102 also includes three optical fiber buffers 106*a*–106*c* disposed inwardly from inner axial tube 110 and outwardly from optical fibers 104*a*–104*c*. In this particular example, optical fiber buffers 106 comprise 400 μm of silicone and 700 μm of Teflon FEP. Although silicone and Teflon are used in this example, any other optical fiber buffer materials may be used without departing from the scope of the present disclosure.

Fiber in metal tube core 102 further includes a filler material 108 disposed inwardly from inner axial tube 110 and capable of substantially filling any void spaces within inner axial tube 110. In some cases, filler material 108 can operate to support optical fibers 104 and/or minimize vibration. Filler material 108 can comprise, for example, thixotropic gel, a hydrophobic gel, a hydrogen scavenging gel, or any other suitable filler material. In one particular embodiment, filler material 108 comprises Sepigel H200 LWT having a hydrogen scavenger. Using a filler material 108 having a hydrogen scavenger allows fiber optic cable 100 to alleviate hydrogen degradation of optical fibers 104 for hydrogen generated within core 102. Moreover, implementing a hydrogen scavenging or hydrogen absorptive material within filler material 108 can assist in creating a hydrogen barrier for hydrogen generated by a hostile environment.

Figure 1B:
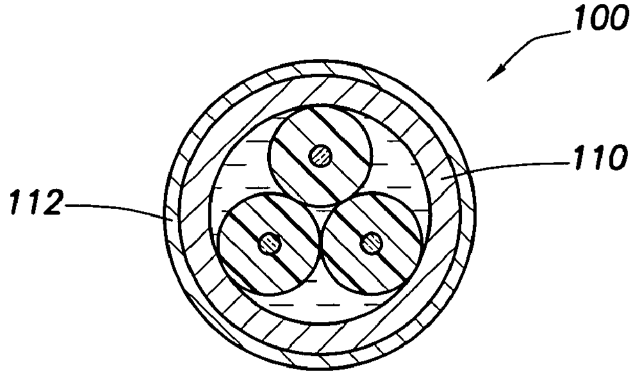

FIG. 1B shows a cross-sectional view of a fiber optic cable 100 after formation of a conductive layer 112 outwardly from fiber in metal core 102. Forming conductive layer 112 may be effected through any of a variety of standard techniques associated with cable manufacturing. In various embodiments, conductive layer 112 may be capable of conveying electrical signals from instrumentation located outside a hostile environment to sensors and/or equipment within the hostile environment. In other embodiments, conductive layer 112 may be capable of conveying electrical signals from sensors and/or equipment within the hostile environment to instrumentation outside the hostile environment. In some cases, the electrical signal conveyed may comprise, for example, a control signal, a voltage, a current, or a combination of these or other electrical signals.

Conductive layer 112 can comprise any conductive material, such as, for example, copper, gold, silver, tin, or a combination of these or other metallic or non-metallic materials. In some embodiments, conductive layer 112 can comprise, for example, a braided, straight, or helically laid conductor. In this particular embodiment, conductive layer 112 comprises a wickable conductor such as, for example, a braided conductor, a helically laid conductor, or any other wickable conductive layer. As used throughout this document, the phrase "wickable conductor" refers to a conductor that is capable of conveying molten material by capillary, adhesive, or wicking action. In this particular example, conductive layer 112 comprises a pre-tinned copper braid.

In this particular embodiment, conductive layer 112 resides outwardly from and in contact with inner axial tube 110. That is, at least a portion of an inner surface of conductive layer 112 contacts at least a portion of an outer surface of inner axial tube 110. In some cases, forming conductive layer 112 in contact with inner axial tube 110 can improve the conductivity of fiber optic cable 100 by reducing the linear resistance associated with cable 100. Conductive layer 112 can comprise any selected thickness that achieves a desired conductivity for fiber optic cable 100. For example, conductive layer 112 can comprise a thickness of at least three-thousandths of an inch, at least seven-thousandths of an inch, at least twelve-thousandths of an inch, or any other thickness that achieves the selected conductivity.

In this example, the portion of conductive layer 112 in contact with inner axial tube 110 adheres to inner axial tube 110 through an interference fit. As used throughout this document, the phrase "interference fit" refers to adhesion between mating surfaces that results from tensile and/or compressive forces associated with at least one of the two surfaces. Moreover, an interference fit is one that is substantially free from chemical or mechanical bonding processes. That is, the points at which conductive layer 112 adhere to inner axial tube 110 are substantially free from ionic bonding, covalent bonding, epoxy bonding, brazing and/or welding.

Although this example shows inner axial tube 110 and conductive layer 112 as being formed without interstitial layers between them, such interstitial layers could alternatively be formed without departing from the scope of the present disclosure. In an alternative embodiment, an insulating layer can be formed between inner axial tube 110 and conductive layer 112. In that embodiment, the insulating layer may comprise, for example, a Polyimide material, a TEFLON PFA material, or a combination of these or other insulating materials.

Figure 1C:
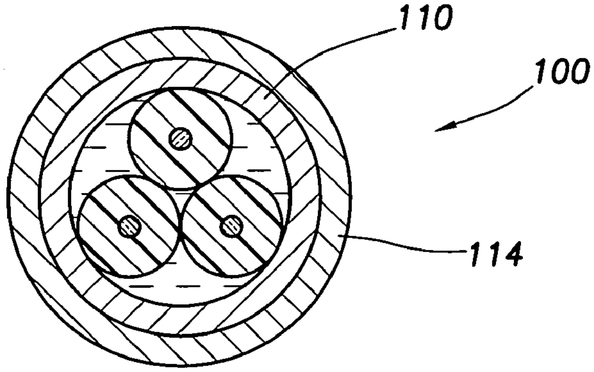

FIG. 1C shows a cross-sectional view of a fiber optic cable 100 after formation of a hydrogen barrier shell 114 outwardly from inner axial tube 110. As used throughout this document, the term "shell" refers to a layer that creates a cylindrical encapsulation substantially around a material disposed inwardly therefrom. In other words, a shell can form a cylindrical covering substantially around an outer surface of, for example, inner axial tube 110 of fiber in metal core 102. In this particular embodiment, hydrogen barrier shell 114 forms a cylindrical covering substantially around an outer surface of inner axial tube 110. Moreover, the term "shell" refers to an outer layer that substantially provides its own mechanical integrity and is not required to function as a pressure boundary. In contrast, a coating typically relies on an ionic or covalent bond with a substrate to provide its mechanical integrity.

In various embodiments, hydrogen barrier shell 114 may be capable of conveying electrical signals from instrumentation located outside a hostile environment to sensors and/or equipment within the hostile environment. In other embodiments, hydrogen barrier shell 114 may be capable of conveying electrical signals from sensors and/or equipment within the hostile environment to instrumentation outside the hostile environment. In some cases, the electrical signal conveyed may comprise, for example, a control signal, a voltage, a current, or a combination of these or other electrical signals.

Hydrogen barrier shell 114 can comprise any material or combination of materials capable of reducing hydrogen permeation through fiber optic cable 100. For example, hydrogen barrier shell 114 can comprise carbon, silicon, germanium, tin, lead, gold, or a combination of these or other materials. In this example, hydrogen barrier shell 114 comprises a thickness capable of withstanding scratches and other surface blemishes without significantly affecting the ability of hydrogen barrier shell 114 to reduce and/or delay hydrogen permeation through cable 100. In some cases, hydrogen barrier shell 114 can comprise a thickness of, for example, at least sixteen microns, at least one-thousandth of an inch, at least five-thousandths of an inch, at least twelve-thousandths of an inch, at least twenty thousandths of an inch, or any other selected thickness.

In some embodiments, hydrogen barrier shell 114 may be capable of reducing and/or delaying radiation permeation through fiber optic cable 100. In some cases, hydrogen barrier shell 114 can comprise a material capable of reducing ionizing radiation flux intensity through fiber optic cable 100, such as, for example, bismuth, antimony, thallium, indium, arsenic, aluminum, boron, lead, or any other material capable of reducing ionizing radiation flux intensity through fiber optic cable 100. In other cases, an additional layer capable of reducing ionizing radiation flux intensity can be formed between hydrogen barrier shell 114 and inner axial tube 110 or can be formed such that the additional layer resides outwardly from hydrogen barrier layer 114.

Forming hydrogen barrier shell 114 may be effected through any of a variety of manufacturing processes. In one particular embodiment, hydrogen barrier shell 114 is formed by passing conductive layer 112 through a molten bath comprising a material or combination of materials capable of reducing and/or delaying hydrogen permeation through fiber optic cable 100. The material of the molten bath can comprise, for example, carbon, silicon, germanium, tin, lead, gold, or a combination of these or other elements. In this particular embodiment, the material of the molten bath comprises tin. In that embodiment, conductive layer 112 operates to convey the tin material of the molten bath into conductive layer 112 by a wicking action to form hydrogen barrier shell 114. In this particular embodiment, the temperature of the tin material of the molten bath comprises approximately 240° C. Although the temperature of the molten bath material is 240° C. in this example, any other temperature can be used without departing from the scope of the present disclosure.

Cable manufacturers can adjust various process parameters to achieve a desired thickness and/or hydrogen permeation rate for hydrogen barrier shell 114. For example, cable manufacturers can adjust the temperature of the material of the molten bath and the length of the molten bath to achieve the desired results. In various embodiments, the temperature of the material of the molten bath can be manipulated by combining the desired material with eutectics of that material. For example, if the material of the molten bath comprises lead, then a cable manufacturer could add tin to the molten bath to manipulate the melting point of lead.

In addition, cable manufacturers can adjust the rate at which conductive layer 112 passes through the molten bath. In most cases, the rate at which conductive layer 112 passes through the molten bath is based at least in part on the temperature associated with the material of the molten bath. That is, the higher the temperature of the material of the molten bath, the higher the rate at which conductive layer 112 passes through the molten bath.

In various embodiments, conductive layer 112 passes through the molten bath at a rate sufficient to minimize the effect of high temperatures associated with the molten bath material on the materials within fiber in metal core 102. In other words, each portion of conductive layer 112 remains in the molten bath for a period of time that minimizes the effects of the high temperature on materials within core 102 and, in particular, on filler material 108. In some cases, each portion of conductive layer 112 remains in the molten bath for, for example, no more than one-hundred milli-seconds, no more than ½-second, or no more than one-second. The period of time that each portion of conductive layer 112 can remain in the molten bath depends at least in part on the temperature of the molten material and the temperature ratings of the materials within fiber in metal core 102.

In some embodiments, the manufacturing process associated with forming hydrogen barrier shell 114 can implement a 2:1 ratio between a desired rate of travel and the length of the molten bath. That is, if the desired rate of travel through the molten bath is ten-feet per second and, to achieve the desired thickness of hydrogen barrier shell 114, each portion of conductive layer 112 remains in the molten bath for ½-second, then the length of the molten bath is selected to be five-feet. In most cases, the 2:1 ratio can achieve the desired thickness of hydrogen barrier shell 114 and can minimize the effects of the high temperature on the materials of fiber in metal core 102. Although this example implements a 2:1 ratio, any other selected ratio can be used without departing from the scope of the present disclosure.

In an alternative embodiment, before passing conductive layer 112 through the molten bath to form hydrogen barrier shell 114, conductive layer 112 can pass through an oxide cleaner to remove any oxides associated with conductive layer 112. In various embodiments, the oxide cleaner may comprise, for example, an acid flux cleaner, a terpene flux cleaner, an environmentally safe flux cleaner, or any other suitable flux cleaner.

Figure 1D:
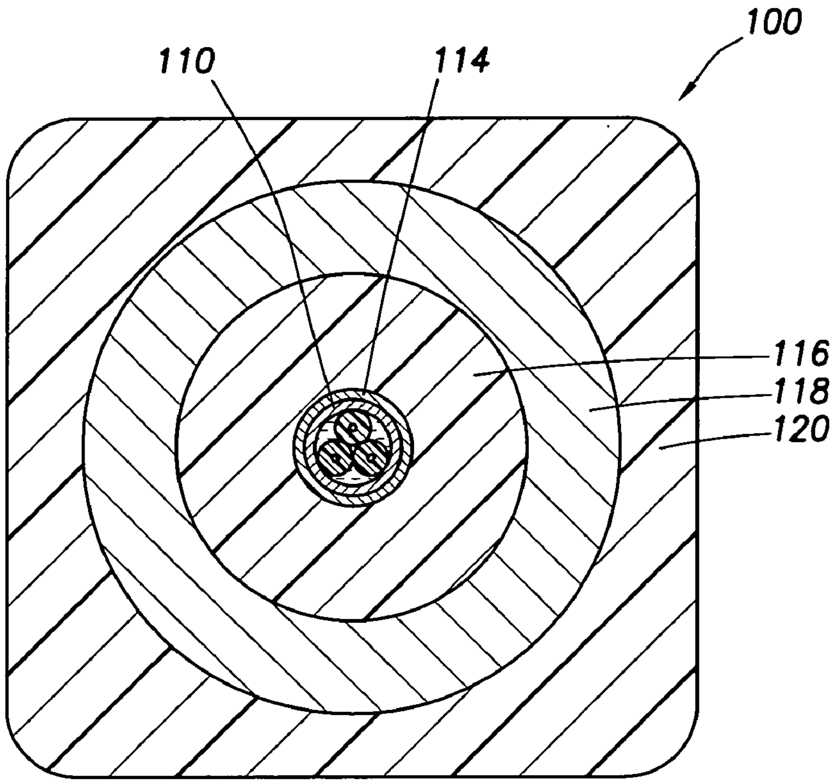

FIG. 1D shows a cross-sectional view of a fiber optic cable 100 after formation of a buffer layer 116 outwardly from hydrogen barrier shell 114, an outer axial tube 118 outwardly from buffer layer 116, and an encapsulation layer 120 outwardly from outer axial tube 118. Forming buffer layer 116, outer axial tube 118, and encapsulation layer 120 may be effected through any of a variety of standard cable manufacturing techniques. Although this example shows buffer layer 116, outer axial tube 118, and encapsulation layer 120 as being formed without interstitial layers, such interstitial layers could alternatively be formed without departing from the scope of the present disclosure.

Buffer layer 116 can comprise, for example, Polypropylene, Fluoroethylenepropylene (FEP), Ethylene-chlorotrifluoroethylene (ECTFE), Polyvinylidene fluoride (PVDF), perfluor alkoxy (PFA), Polyether-ether-ketone (PEEK), TEFLON, TEFLON PFA, TETZEL, or any other suitable material. In various embodiments, buffer layer 116 may be capable of maintaining inner axial tube 110 approximately centered within outer axial tube 118. In other embodiments, buffer layer 116 may be capable of protecting hydrogen barrier shell 114 and/or core 102 from damage that may result from vibration.

Outer axial tube 118 can comprise, for example, Stainless Steel, Inconel, Incoloy, or any other corrosion resistant metal alloy. In this particular example, outer axial tube 118 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of outer axial tube 118 may vary over the length of fiber optic cable 100 depending upon the material selected. In other embodiments, outer axial tube 118 can comprise a high strength and/or high temperature polymer, such as, for example, a carbon based polymer, a polyimide, or other suitable epoxy or polymer.

In some cases, the formation of outer axial tube 118 results in outer axial tube 118 compressing buffer layer 116 against hydrogen barrier shell 114. In those cases, the compression of buffer layer 116 can operate to minimize any relative movement between outer axial tube 118 and hydrogen barrier shell 114.

In this particular embodiment, encapsulation layer 120 operates to protect the materials of fiber optic cable 100 during handling and installation. Encapsulation layer 120 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, or any other suitable material. In this particular embodiment, encapsulation layer 120 comprises an 11 mm by 11 mm Santoprene layer. Although this example includes an 11 mm by 11 mm encapsulation layer, any other combination of size and temperature rating can be used without departing from the scope of the present disclosure.

Figure 2A:
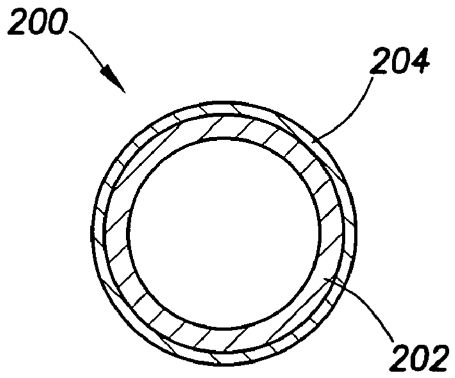
FIGS. 2A through 2C are cross-sectional views showing another example of a method of forming one embodiment of a hydrogen and/or radiation hindering fiber optic conduit for use in a hostile environment.
Figure 2B:
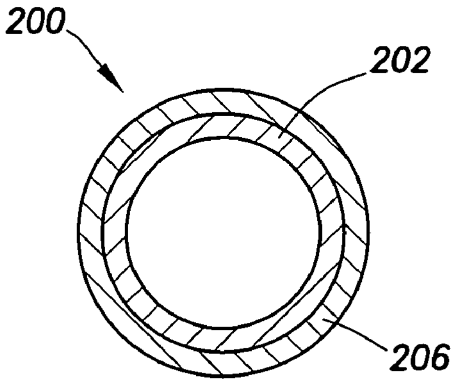
Figure 2C:
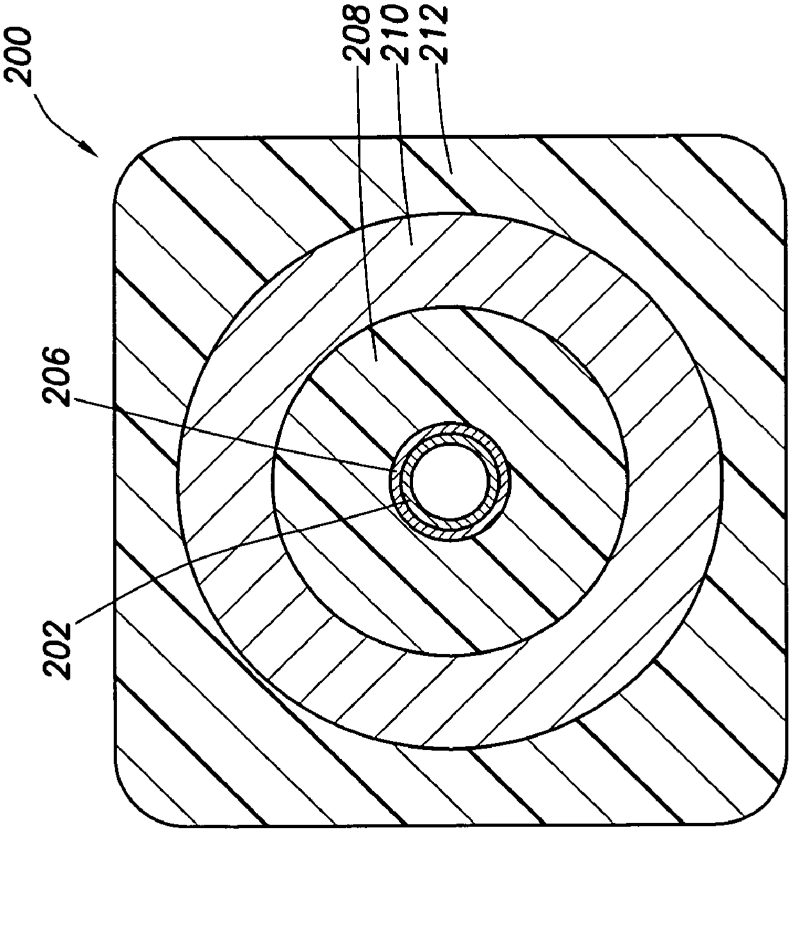

FIGS. 2A through 2C are cross-sectional views showing one example of a method of forming one embodiment of a hydrogen and/or radiation hindering fiber optic conduit 200 for use in a hostile environment. FIG. 2A shows a cross-sectional view of a fiber optic conduit 200 after formation of an inner axial tube 202 and a conductive layer 204 outwardly from inner axial tube 202. Inner axial tube 202 may comprise, for example, Stainless Steel, Inconel, Incoloy, or any other corrosion resistant metal alloy. In this particular example, inner axial tube 202 comprises a Stainless Steel micro-tube having approximately 1/16-inch outer diameter and a 0.005-inch wall thickness. Although this example includes an outer diameter of 1/16-inch and a wall thickness of 0.005-inches, any other selected outer diameter and wall thickness may be used without departing from the scope of the present disclosure. Moreover, the selected diameter and wall thickness of inner axial tube 202 may vary throughout the length of fiber optic conduit 200.

In other embodiments, inner axial tube 202 can comprise a high strength and/or high temperature polymer, such as, for example, a carbon based polymer, a polyimide, or other suitable epoxy or polymer. In those embodiments, the high strength and/or high temperature polymer should have a thickness capable of providing pressure integrity for any pressure formed within cable 200.

Forming inner axial tube 202 may be effected through any of a variety of manufacturing techniques. In some embodiments, inner axial tube 202 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique.

Forming conductive layer 204 may be effected through any of a variety of standard techniques associated with cable manufacturing. In various embodiments, conductive layer 204 may be capable of conveying electrical signals between instrumentation located outside a hostile environment and sensors and/or equipment within the hostile environment. In some cases, the electrical signal conveyed may comprise, for example, a control signal, a voltage, a current, or a combination of these or other electrical signals.

Conductive layer 204 can comprise any conductive material, such as, for example, copper, gold, silver, tin, or a combination of these or other metallic or non-metallic materials. In some embodiments, conductive layer can comprise, for example, a wickable conductor such as, for example, a braided conductor, a helically laid conductor, or any other wickable conductive layer. In this particular example, conductive layer 204 comprises a pre-tinned copper braid. Using a pre-tinned conductive layer 204 can advantageously assist in the integration of a molten bath material into conductive layer 204 by a wicking action.

In this example, conductive layer 204 resides outwardly from and in contact with inner axial tube 202. That is, at least a portion of an inner surface of conductive layer 204 contacts at least a portion of an outer surface of inner axial tube 202. In some cases, forming conductive layer 204 in contact with inner axial tube 202 can improve the conductivity of fiber optic conduit 200 by reducing the linear resistance associated with conduit 200. Conductive layer 204 can comprise, for example, a thickness of at least sixteen microns, at least one-thousandth of an inch, at least five-thousandths of an inch, at least ten-thousandths of an inch, or any other selected thickness.

In this example, the portion of conductive layer 204 in contact with inner axial tube 202 adheres to inner axial tube 202 through an interference fit. That is, the points at which conductive layer 204 adhere to inner axial tube 202 are substantially free from ionic bonding, covalent bonding, epoxy bonding, brazing and/or welding. Although this example shows inner axial tube 202 and conductive layer 204 as being formed without interstitial layers between them, such interstitial layers could alternatively be formed without departing from the scope of the present disclosure. In an alternative embodiment, an insulating layer can be formed between inner axial tube 202 and conductive layer 204. In that embodiment, the insulating layer may comprise, for example, a Polyimide material, a TEFLON PFA material, or a combination of these or other insulating materials.

FIG. 2B shows a cross-sectional view of a fiber optic conduit 200 after formation of a hydrogen barrier shell 206 outwardly from inner axial tube 202. In this particular embodiment, hydrogen barrier shell 206 operates to reduce and/or delay hydrogen permeation through fiber optic conduit 200. In other embodiments, hydrogen barrier shell 206 may be capable of reducing and/or delaying radiation permeation through conduit 200. In this particular embodiment, hydrogen barrier shell 206 forms a cylindrical covering substantially around an outer surface of inner axial tube 202.

In this particular embodiment, hydrogen barrier shell 206 resides outwardly from and in contact with inner axial tube 202. That is, at least a portion of an inner surface of hydrogen barrier shell 206 contacts at least a portion of an outer surface of inner axial tube 202. In this example, the portion of hydrogen barrier shell 206 in contact with inner axial tube 202 adheres to inner axial tube 202 through an interference fit.

Hydrogen barrier shell 206 can comprise any material or combination of materials capable of reducing hydrogen through fiber optic conduit 200. For example, hydrogen barrier shell 206 can comprise carbon, silicon, copper, germanium, tin, lead, gold, or a combination of these or other materials. In some cases, hydrogen barrier shell 206 can comprise a material capable of reducing ionizing radiation flux intensity through fiber optic cable 200, such as, for example, bismuth, antimony, thallium, indium, arsenic, aluminum, boron, lead, or any other material capable of reducing ionizing radiation flux intensity through fiber optic cable 200. In other cases, an additional layer capable of reducing ionizing radiation flux intensity can be formed between hydrogen barrier shell 206 and inner axial tube 202 or can be formed such that the additional layer resides outwardly from hydrogen barrier layer 206. In this example, hydrogen barrier shell 206 comprises a thickness capable of withstanding scratches and other surface blemishes without significantly affecting the ability of hydrogen barrier shell 206 to reduce and/or delay hydrogen and/or radiation permeation through conduit 200.

Forming hydrogen barrier shell 206 may be effected through any of a variety of manufacturing processes. In one particular embodiment, hydrogen barrier shell 206 is formed by passing conductive layer 204 through a molten bath comprising a material or combination of materials capable of reducing and/or delaying hydrogen permeation through fiber optic conduit 200. In some cases, the molten bath material may also be capable of reducing and/or delaying radiation permeation through fiber optic conduit 200. The material of the molten bath can comprise, for example, carbon, silicon, germanium, tin, lead, gold, or a combination of these or other elements.

In this particular embodiment, the material of the molten bath comprises tin. In that embodiment, conductive layer 204 operates to integrate the tin material of the molten bath into conductive layer 204 by a wicking action to form hydrogen barrier shell 206. In this particular embodiment, the temperature of the tin material of the molten bath comprises approximately 240° C. Although the temperature of the molten bath material is 240° C. in this example, any other temperature can be used without departing from the scope of the present disclosure.

Cable manufacturers can adjust various process parameters to achieve a desired thickness and/or hydrogen or radiation permeation rate for hydrogen barrier shell 206. For example, cable manufacturers can adjust the temperature of the material of the molten bath, the amount of time that conductive layer 204 remains in the molten bath, and the length of the molten bath to achieve the desired results. In various embodiments, the temperature of the material of the molten bath can be manipulated by combining the desired material with eutectics of that material. For example, if the material of the molten bath comprises lead, then a cable manufacturer could add tin to the molten bath to manipulate the melting point of lead.

In addition, cable manufacturers can adjust the rate at which conductive layer 204 passes through the molten bath. In most cases, the rate at which conductive layer 204 passes through the molten bath is based at least in part on the temperature associated with the material of the molten bath. That is, in most cases, the higher the temperature of the material of the molten bath, the higher the rate at which conductive layer 204 passes through the molten bath. Moreover, the rate at which conductive layer 204 passes through the molten bath is based at least in part on the material selected for conductive layer 204, the thickness of conductive layer 204, the type of conductor selected for conductive layer 204, and the rate at which the molten material integrates into or through conductive layer 204.

In various embodiments, conductive layer 204 passes through the molten bath at a rate sufficient to ensure that the molten material is sufficiently integrated through the thickness of conductive layer 204 by a wicking action. In other words, each portion of conductive layer 204 remains in the molten bath for a period of time that ensures that the molten bath material is sufficiently conveyed through the thickness of conductive layer 204. In some cases, each portion of conductive layer 204 remains in the molten bath for, for example, for at least one-hundred milli-seconds, for at least ½-second, for at least one-second, for at least two seconds, or any other desired length of time. The period of time that each portion of conductive layer 204 can remain in the molten bath depends at least in part on the temperature of the molten material, the material selected for the molten material, the thickness of conductive layer 204, the material selected for conductive layer 204, the type of conductor selected for conductive layer 204, and the temperature ratings of the materials associated with inner axial tube 202 and conductive layer 204.

In some embodiments, the manufacturing process associated with forming hydrogen barrier shell 206 can implement a 2:1 ratio between a desired rate of travel and the length of the molten bath. That is, if the desired rate of travel through the molten bath is three-feet per second and, to achieve the desired thickness of hydrogen barrier shell 206, each portion of conductive layer 204 remains in the molten bath for ½-second, then the length of the molten bath is selected to be one and one-half feet. In most cases, the 2:1 ratio can achieve the desired thickness of hydrogen barrier shell 206 and can ensure that the molten material is sufficiently conveyed through or integrated into the thickness of conductive layer 204. Although this example implements a 2:1 ratio, any other selected ratio can be used without departing from the scope of the present disclosure.

In this particular example, hydrogen barrier shell 206 comprises a post-formation thickness of at least approximately one-thousandth of an inch (e.g., thickness is at least approximately 0.001" or 1 mil). In some embodiments, hydrogen barrier shell 206 can comprise a post-formation thickness that is capable of withstanding scratches and other surface blemishes without significantly affecting the ability of hydrogen barrier shell 206 to reduce and/or delay hydrogen and/or radiation permeation through conduit 200. In some cases, hydrogen barrier shell 206 can comprise a post-formation thickness of, for example, at least sixteen microns, at least one-thousandth of an inch, at least five-thousandths of an inch, at least twelve-thousandths of an inch, at least twenty thousandths of an inch, or any other selected thickness. In other embodiments, hydrogen barrier shell 206 can comprise a post-formation thickness that is capable of surviving diffusion between hydrogen barrier shell 206 and inner axial tube 202 without significantly affecting the ability of hydrogen barrier shell 206 to reduce and/or delay hydrogen and/or radiation permeation through conduit 200.

In an alternative embodiment, before passing conductive layer 204 through the molten bath to form hydrogen barrier shell 206, conductive layer 204 can pass through an oxide cleaner to remove any oxides associated with conductive layer 204. In various embodiments, the oxide cleaner may comprise, for example, an acid flux cleaner, a terpene flux cleaner, an environmentally safe flux cleaner, or any other suitable flux cleaner.

In this particular embodiment, hydrogen barrier shell 206 is formed by passing conductive layer 204 through a molten bath. In an alternative embodiment, hydrogen barrier shell can be formed by wrapping or surrounding conductive layer 204 with a metal tape or solder. The metal tape or solder can comprise a desired thickness of a desired material. The material of the metal tape or solder can comprise, for example, carbon, silicon, germanium, tin, lead, gold, or a combination of these or other elements. In that embodiment, after wrapping or surrounding conductive layer 204 with a metal tape or solder, the combination of the wrapped conductive layer 204 can be heated to the melting point of the material of the metal tape or solder. Heating the metal tape or solder to its melting point will result in the integration of the material of the metal tape or solder into conductive layer 204 by a wicking action.

FIG. 2C shows a cross-sectional view of a fiber optic conduit 200 after formation of a buffer layer 208 outwardly from hydrogen barrier shell 206, an outer axial tube 210 outwardly from buffer layer 208, and an encapsulation layer 212 outwardly from outer axial tube 210. Forming buffer layer 208, outer axial tube 210, and encapsulation layer 212 may be effected through any of a variety of standard cable manufacturing techniques. Although this example shows buffer layer 208, outer axial tube 210, and encapsulation layer 212 as being formed without interstitial layers, such interstitial layers could alternatively be formed without departing from the scope of the present disclosure.

Buffer layer 208 can comprise, for example, Polypropylene, Fluoroethylenepropylene (FEP), Ethylene-chlorotrifluoroethylene (ECTFE), Polyvinylidene fluoride (PVDF), perfluor alkoxy (PFA), Polyether-ether-ketone (PEEK), TEFLON, TEFLON PFA, TETZEL, or any other suitable material. In various embodiments, buffer layer 208 may be capable of maintaining inner axial tube 202 approximately centered within outer axial tube 210. In other embodiments, buffer layer 208 may be capable of protecting hydrogen barrier shell 206 from damage that may result from vibration.

In this particular embodiment, outer axial tube 210 operates as a hydrostatic pressure boundary for fiber optic conduit 200. That is, outer axial tube 210 is capable of withstanding relatively high differential pressures between an environment within outer axial tube 210 and an environment external to outer axial tube 210. Outer axial tube 210 can comprise, for example, Stainless Steel, Inconel, Incoloy, or any other corrosion resistant metal alloy. In this particular example, outer axial tube 210 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of outer axial tube 210 may vary over the length of fiber optic conduit 200 depending upon the material selected. In other embodiments, outer axial tube 210 can comprise a high strength and/or high temperature polymer, such as, for example, a carbon based polymer, a polyimide, or other suitable epoxy or polymer.

In some cases, the formation of outer axial tube 210 results in outer axial tube 210 compressing buffer layer 208 against hydrogen barrier shell 206. In those cases, the compression of buffer layer 208 can operate to minimize any relative movement between outer axial tube 210 and hydrogen barrier shell 206.

In this particular embodiment, encapsulation layer 212 operates to protect the materials of fiber optic conduit 200 during handling and installation. Encapsulation layer 212 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, or any other suitable material. In this particular embodiment, encapsulation layer 212 comprises an 11 mm by 11 mm Santoprene layer. Although this example includes an 11 mm by 11 mm encapsulation layer, any other combination of size and temperature rating can be used without departing from the scope of the present disclosure.

In this particular embodiment, buffer layer 208 operates to maintain inner axial 202 approximately centered within outer axial tube 210. In an alternative embodiment, conduit 200 may be formed without buffer layer 208. In that embodiment, the combination of inner axial tube 202 and hydrogen barrier shell 206 may be expanded using an expandable technology such that an interference fit is formed between outer axial tube 210 and hydrogen barrier layer 206. The expandable technology may include, for example, hydraulically expanding, pneumatically expanding, mechanically expanding, or any other desired expandable technology.

As one particular example, the combination of inner axial tube 202 and hydrogen barrier shell 206 are mechanically expanded using a mini-expandable pig. The term "pig" refers to a mechanical device where at least a portion of the device has an outer diameter that is capable of increasing the diameter of a cylindrical device. That is, at least a portion of the pig has an outer diameter that is greater than an inner diameter of a device that is being expanded. Moreover, a pig comprises a material that is harder than a material associated with the cylindrical device being expanded. For example, where the cylindrical device being expanded comprises an Inconel material, the pig comprises a material that is harder than Inconel.

In this alternative embodiment, the mini-expandable pig comprises a proximate end that has an outer diameter that is smaller than an outer diameter associated with a distal end. In some embodiments, the mini-expandable pig can have, for example, a bullet shape, a conical shape, or any other desired shape.

The mini-expandable pig can be forced through an inner diameter of inner axial tube 202 and along a length of inner axial tube 202 using, for example, a hydraulic force, a pneumatic force, or any other force capable of passing the pig through inner axial tube 202. The force used to cause the mini-expandable pig to slide through and expand inner axial tube 202 depends at least in part on the maximum outer diameter of the pig, the malleability of the material of inner axial tube 202, and the hardness of material of the mini-expandable pig. The force used to cause the mini-expandable pig to slide through and expand inner axial tube 202 can comprise any force up to the burst pressure of inner axial tube 202.

Figure 3A:
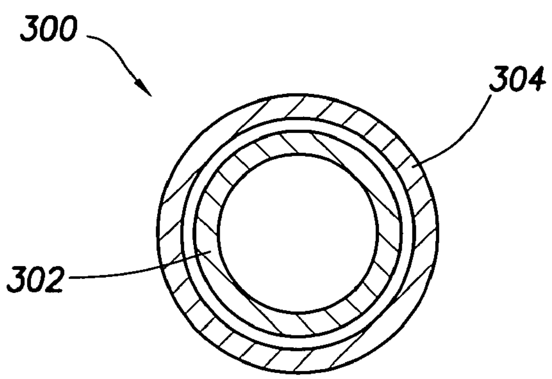
FIGS. 3A through 3C are cross-sectional views showing one example of a method of forming one embodiment of a hydrogen and/or radiation hindering fiber optic conduit for use in a hostile environment.
Figure 3B:
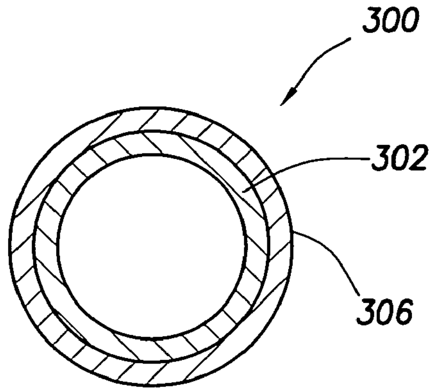
Figure 3C:
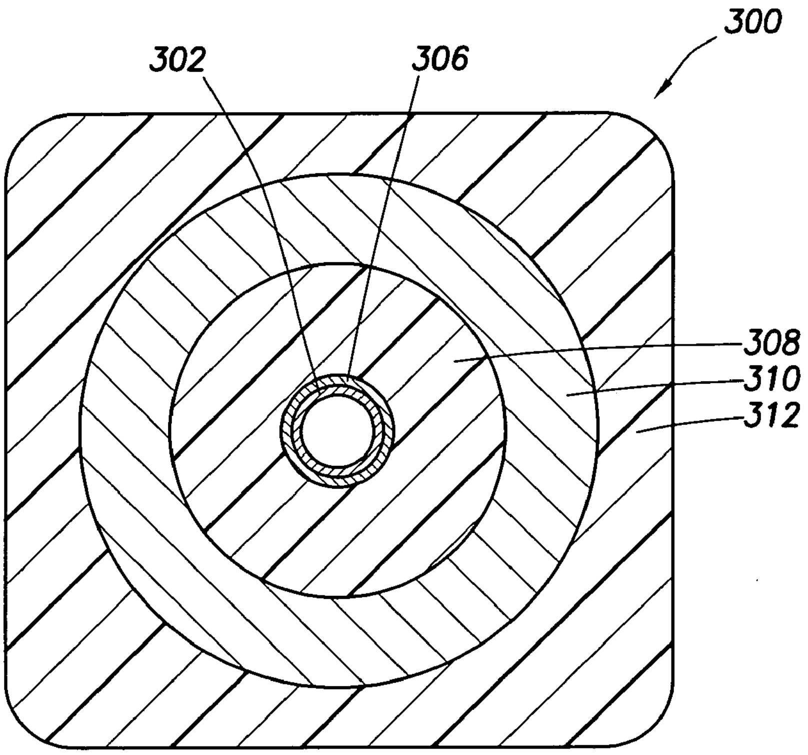

FIGS. 3A through 3C are cross-sectional views showing one example of a method of forming one embodiment of a hydrogen and/or radiation hindering fiber optic conduit 300 for use in a hostile environment. FIG. 3A shows a cross-sectional view of a fiber optic conduit 300 after formation of an inner axial tube 302 and a hydrogen barrier layer 304 outwardly from inner axial tube 302. Inner axial tube 302 may comprise, for example, Stainless Steel, Inconel, Incoloy, or any other corrosion resistant metal alloy. In this particular example, inner axial tube 302 comprises a Stainless Steel micro-tube having approximately 1/16-inch outer diameter and a 0.005-inch wall thickness. Although this example includes an outer diameter of 1/16-inch and a wall thickness of 0.005-inches, any other selected outer diameter and wall thickness may be used without departing from the scope of the present disclosure. Moreover, the selected diameter and wall thickness of inner axial tube 302 may vary throughout the length of fiber optic conduit 300.

In other embodiments, inner axial tube 302 can comprise a high strength and/or high temperature polymer, such as, for example, a carbon based polymer, a polyimide, or other suitable epoxy or polymer. In those embodiments, the high strength and/or high temperature polymer should have a thickness capable of providing pressure integrity for any pressure formed within cable 300.

Forming inner axial tube 302 may be effected through any of a variety of manufacturing techniques. In some embodiments, inner axial tube 302 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique.

Hydrogen barrier layer 304 can comprise any material or combination of materials capable of reducing hydrogen through fiber optic conduit 300. For example, hydrogen barrier layer 304 can comprise carbon, silicon, germanium, tin, lead, lead hydride, gold, a eutectic of these materials, or a combination of these or other materials. In some cases, hydrogen barrier layer 304 can comprise a material capable of reducing ionizing radiation flux intensity through fiber optic cable 300, such as, for example, bismuth, antimony, thallium, indium, arsenic, aluminum, boron, lead, or any other material capable of reducing ionizing radiation flux intensity through fiber optic cable 300. In other cases, an additional layer capable of reducing ionizing radiation flux intensity can be formed between hydrogen barrier layer 304 and inner axial tube 302 or can be formed such that the additional layer resides outwardly from hydrogen barrier layer 304.

In some cases, the material for hydrogen barrier layer 304 can be selected based at least in part on a desired operating temperature or property. For example, if conduit 300 is to be used in a hostile environment having an operating temperature of approximately 300° C., then the material for hydrogen barrier layer 304 should be selected such that its melting point is above at least 300° C. In that example, the material for hydrogen barrier layer 304 could comprise, for example, gold, a eutectic of gold, antimony, palladium, silicon oxynitride, or any other material capable of reducing hydrogen and/or radiation permeation through fiber optic conduit 300 and capable of withstanding an operating temperature of at least 300° C.

In this particular embodiment, hydrogen barrier layer 304 comprises a malleable material having a thickness that is capable of reducing and/or delaying hydrogen permeation through conduit 300. In some cases, hydrogen barrier layer 304 may also be capable of reducing and/or delaying radiation permeation through conduit 300. In various embodiments, hydrogen barrier layer 304 can comprise a malleable material having a thickness that is capable of withstanding scratches and other surface blemishes without significantly affecting the ability of hydrogen barrier layer 304 to reduce and/or delay hydrogen and/or radiation permeation through conduit 300. In other embodiments, hydrogen barrier layer 304 can comprise a thickness that is capable of surviving diffusion of particles between layer 304 and inner axial tube 302 without significantly affecting the ability of hydrogen barrier layer 304 to reduce and/or delay hydrogen and/or radiation permeation through conduit 300. In some cases, hydrogen barrier layer 304 can comprise a thickness of, for example, at least sixteen microns, at least one-thousandth of an inch, at least five-thousandths of an inch, at least ten thousandths of an inch, at least twenty thousandths of an inch, or any other selected thickness.

Forming hydrogen barrier layer 304 may be effected through any of a variety of manufacturing techniques. In this particular embodiment, hydrogen barrier layer 304 is formed by cold rolling a coiled strip stock of gold until the ends of the strip stock approximately abut. In that embodiment, the ends of the strip stock can be mechanically joined by, for example, plasma welding, laser welding, or any other appropriate mechanical or chemical joining technique. Although hydrogen barrier layer 304 is formed by cold rolling and mechanically joining the ends in this example, any other technique for forming an outer barrier layer may be employed without departing from the scope of the present disclosure.

In an alternative embodiment, hydrogen barrier layer 304 can be formed by wrapping a helical metallic tape of a desired material around inner axial tube 302. In that embodiment, the helical metallic tape can be wrapped such that it overlaps another portion of the helical tape. The overlap may comprise, for example, approximately one-quarter of an inch (¼") per turn, one-half of an inch (½") per turn, or any other desired overlap. In some embodiments, the helical tape can be mechanically joined by, for example, a helical seal weld.

In various embodiments, hydrogen barrier layer 304 and inner axial tube 302 can be formed approximately simultaneously. That is, portions of inner axial tube 302 can be cold rolled and mechanically joined just before portions hydrogen barrier layer 304 are cold rolled and mechanically joined. In other embodiments, hydrogen barrier layer 304 and inner axial tube 302 can be formed substantially independently of one another. In those cases, after formation of hydrogen barrier layer 304 and inner axial tube 302, inner axial tube 302 can be inserted into hydrogen barrier layer 304. In this particular embodiment, at least a portion of inner axial tube 302 is cold rolled and mechanically joined before the portion of hydrogen barrier layer 304 that covers that portion of inner axial tube 302 is cold rolled and mechanically joined.

FIG. 3B shows a cross-sectional view of a fiber optic conduit 300 after formation of a hydrogen barrier shell 306 outwardly from inner axial tube 302. In this particular embodiment, hydrogen barrier shell 306 operates to reduce and/or delay hydrogen permeation through fiber optic conduit 300. In other embodiments, hydrogen barrier shell 306 may be capable of reducing and/or delaying radiation permeation through conduit 300. In this particular embodiment, hydrogen barrier shell 306 forms a cylindrical covering substantially around an outer surface of inner axial tube 302.

In this particular embodiment, hydrogen barrier shell 306 resides outwardly from and in contact with inner axial tube 302. That is, at least a portion of an inner surface of hydrogen barrier shell 306 contacts at least a portion of an outer surface of inner axial tube 302. In this example, the portion of hydrogen barrier shell 306 in contact with inner axial tube 302 adheres to inner axial tube 302 through an interference fit.

Forming hydrogen barrier shell 306 may be effected through any of a variety of manufacturing processes. In various embodiments, hydrogen barrier shell 306 may be formed, for example, by compression rolling, swaging, hydro-forming, or any other process capable of forming an interference fit between inner axial tube 302 and hydrogen barrier shell 306. In other embodiments, inner barrier shell 306 may be formed from an electro-plating technology. In those embodiments, hydrogen barrier shell 306 may be constructed without forming hydrogen barrier layer 304.

In one particular embodiment, hydrogen barrier shell 306 is formed by forcing the combination of hydrogen barrier layer 304 and inner axial tube 302 through a swage die or a conical shaped orifice having an outer diameter that is smaller than an outer diameter of hydrogen barrier layer 304. In one particular embodiment, the combination of hydrogen barrier layer 304 and inner axial tube 302 is forced through a conical shaped orifice using a force of approximately 1,500 to 5,000 pounds per square inch (psi). The force used to compress or swage hydrogen barrier layer 304 onto inner axial tube 302 depends at least in part on the minimum outer diameter of the conical orifice, the malleability of the material of hydrogen barrier layer 304, and the hardness of material of the orifice. Although a force of 1,500 to 5,000 psi was used in this example, any force, up to the crush pressure of inner axial tube 302, may be used without departing from the scope of the present disclosure.

In this particular example, hydrogen barrier shell 306 comprises a post-compression thickness of at least approximately one-thousandth of an inch (e.g., thickness of at least approximately 0.001" or 1 mil). In some embodiments, hydrogen barrier shell 306 can comprise a post-formation thickness that is capable of withstanding scratches and other surface blemishes without significantly affecting the ability of hydrogen barrier shell 306 to reduce and/or delay hydrogen and/or radiation permeation through conduit 300. In some cases, hydrogen barrier shell 306 can comprise a post-formation thickness of, for example, at least sixteen microns, at least one-thousandth of an inch, at least five-thousandths of an inch, at least twelve-thousandths of an inch, at least twenty thousandths of an inch, or any other selected thickness. In other embodiments, hydrogen barrier shell 306 can comprise a post-formation thickness that is capable of surviving diffusion between hydrogen barrier shell 306 and inner axial tube 302 without significantly affecting the ability of hydrogen barrier shell 306 to reduce and/or delay hydrogen and/or radiation permeation through conduit 300.

Although this example shows inner axial tube 302 and hydrogen barrier shell 306 as being formed without interstitial layers between them, such interstitial layers could alternatively be formed without departing from the scope of the present disclosure. In an alternative embodiment, an insulating layer can be formed between inner axial tube 302 and hydrogen barrier shell 306. In that embodiment, the insulating layer may comprise, for example, a Polyimide material, a TEFLON PFA material, or a combination of these or other insulating materials.

FIG. 3C shows a cross-sectional view of a fiber optic conduit 300 after formation of a buffer layer 308 outwardly from hydrogen barrier shell 306, an outer axial tube 310 outwardly from buffer layer 308, and an encapsulation layer 312 outwardly from outer axial tube 310. The structure and function of buffer layer 308, outer axial tube 310, and encapsulation layer 312 can be substantially similar in structure and function to buffer layer 208, outer axial tube 210, and encapsulation layer 212 of FIG. 2, respectively. Forming buffer layer 308, outer axial tube 310, and encapsulation layer 312 may be effected through any of a variety of standard cable manufacturing techniques. Although this example shows buffer layer 308, outer axial tube 310, and encapsulation layer 312 as being formed without interstitial layers, such interstitial layers could alternatively be formed without departing from the scope of the present disclosure.

Buffer layer 308 can comprise, for example, Polypropylene, Fluoroethylenepropylene (FEP), Ethylene-chlorotrifluoroethylene (ECTFE), Polyvinylidene fluoride (PVDF), perfluor alkoxy (PFA), Polyether-ether-ketone (PEEK), TEFLON, TEFLON PFA, TETZEL, or any other suitable material. In various embodiments, buffer layer 308 may be capable of maintaining inner axial tube 302 approximately centered within outer axial tube 310. In other embodiments, buffer layer 308 may be capable of protecting hydrogen barrier shell 306 from damage that may result from vibration.

In this particular embodiment, outer axial tube 310 operates as a hydrostatic pressure boundary for fiber optic conduit 300. That is, outer axial tube 310 is capable of withstanding relatively high differential pressures between an environment within outer axial tube 310 and an environment external to outer axial tube 310. Outer axial tube 310 can comprise, for example, Stainless Steel, Inconel, Incoloy, or any other corrosion resistant metal alloy. In this particular example, outer axial tube 310 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of outer axial tube 310 may vary over the length of fiber optic conduit 300 depending upon the material selected. In other embodiments, outer axial tube 310 can comprise a high strength and/or high temperature polymer, such as, for example, a carbon based polymer, a polyimide, or other suitable epoxy or polymer.

In some cases, the formation of outer axial tube 310 results in outer axial tube 310 compressing buffer layer 308 against hydrogen barrier shell 306. In those cases, the compression of buffer layer 308 can operate to minimize any relative movement between outer axial tube 310 and hydrogen barrier shell 306.

In this particular embodiment, encapsulation layer 312 operates to protect the materials of fiber optic conduit 300 during handling and installation. Encapsulation layer 312 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, or any other suitable material. In this particular embodiment, encapsulation layer 312 comprises an 11 mm by 11 mm Santoprene layer. Although this example includes an 11 mm by 11 mm encapsulation layer, any other combination of size and temperature rating can be used without departing from the scope of the present disclosure.

In this particular embodiment, buffer layer 308 operates to maintain inner axial 302 approximately centered within outer axial tube 310. In an alternative embodiment, conduit 300 may be formed without buffer layer 308. In that embodiment, the combination of inner axial tube 302 and hydrogen barrier shell 306 may be expanded using an expandable technology such that an interference fit is formed between outer axial tube 310 and hydrogen barrier layer 306. The expandable technology may include, for example, hydraulically expanding, pneumatically expanding, mechanically expanding, or any other desired expandable technology.

In various embodiments, one or more optical fibers can be installed within, for example, fiber optic conduits 200 and 300 of FIGS. 2 and 3, respectively. The one or more optical fibers can comprise, for example, a single mode optical fiber, a multi-mode optical fiber, or a combination of these of other fiber types. In some embodiments, the one or more optical fibers may be installed, for example, after the conduit is installed within a well-bore, before the conduit is installed within a well-bore, or at any other appropriate time.

The one or more optical fibers can be installed within conduits 200 and 300 using any of a variety of techniques. For example, the one or more optical fibers could be pumped into conduits 200 and 300. In those embodiments, the optical fibers can be used as a distributed sensor within the hostile environment. That is, one or more optical fibers within optical conduits 200 and 300 may be capable of, for example, sensing a temperature profile, a strain profile, or a combination of these or other parameters. In other embodiments, the one or more optical fibers within fiber optic conduits 200 and 300 can be used to communicate data from sensors within a hostile environment to instrumentation outside the environment.

In some embodiments, one or more hydrogen scavenging materials can be installed within, for example, fiber optic conduits 200 and 300. The hydrogen scavenging materials can comprise, for example, a hydrogen scavenging gel or other hydrogen scavenging material that adheres to the one or more optical fibers installed within the fiber optic conduits. Using a hydrogen scavenging material within the fiber optic conduit allows the fiber optic conduit to alleviate hydrogen degradation of the one or more optical fibers for hydrogen generated within the conduit.

In one particular embodiment, the one or more fiber optic cables within fiber optic conduits 200 and 300 can facilitate the communication of data from sensors within a down-hole oil or gas well to instrumentation outside the down-hole well. In that embodiment, the down-hole oil or gas well environment typically includes the presence of hydrogen, relatively high temperatures, and/or corrosive chemistries. In most cases, the relatively high temperature of the down-hole environment can be, for example, at least 30° C., at least 100° C., at least 150° C., at least 300° C., or more. In other embodiments, the down-hole oil or gas well environment may also include one or more radiation sources, such as, a pulse neutron generator, a gamma ray tool, a line of radioactive markers that are co-axial with or co-propagating with the optical fiber, or a combination of these or other radiation sources. In some embodiments, fiber optic conduits 200 and 300 are capable of being used in a sub-sea environment that includes the presence of hydrogen.

One aspect of this disclosure recognizes that forming a barrier shell within a fiber optic conduit can alleviate some of the problems conventionally associated with the use of optical fibers in hostile environments. In particular, forming a barrier shell within a fiber optic conduit can minimize and/or delay the deleterious effects of hydrogen on the optical fibers used in hostile environments, such as those found in the down-hole oil or gas well industry and/or the under-sea telecommunications industry. Moreover, forming a barrier shell within a fiber optical conduit can minimize and/or delay the deleterious effects of ionizing radiation on the optical fibers used in the hostile environments.

Figure 4:
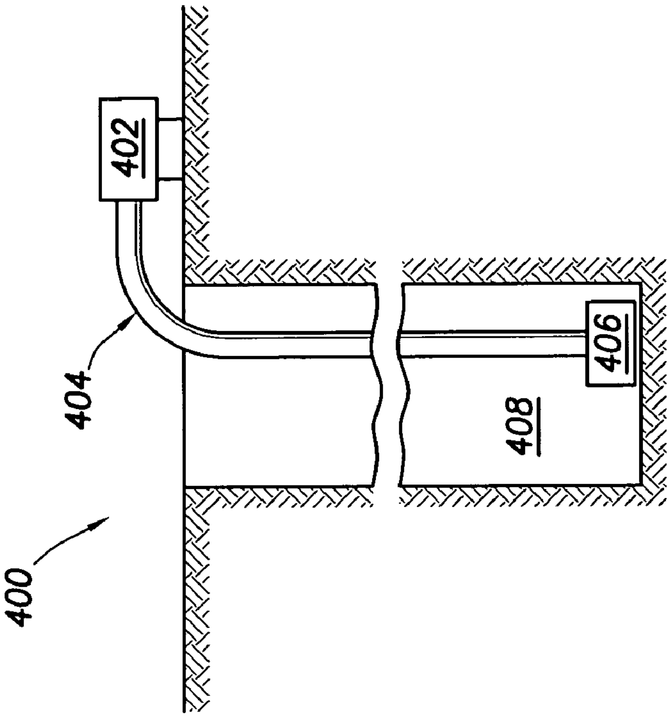
FIG. 4 is a block diagram illustrating a control system implementing a hydrogen and/or radiation hindering fiber optic cable or fiber optic conduit having one or more optical fibers in a down-hole environment.

In various embodiments, fiber optic cable 100 of FIG. 1 is capable of providing reliable transmission of optical signals between one or more sensors within a hostile environment and instrumentation outside the hostile environment. In other embodiments, one or more optical fibers installed within fiber optic conduits 200 and 300 are capable of providing reliable transmission of optical signals between one or more sensors within a hostile environment and instrumentation outside the hostile environment. In some embodiments, fiber optic cable 100, and fiber optic conduits 200 and 300 are capable of conveying electrical signals between instrumentation outside the environment and sensors and/or equipment within the environment. FIG. 4 illustrates one particular implementation of fiber optic cable 100, or fiber optic conduits 200 and 300 after one or more optical fibers have been installed.

FIG. 4 is a block diagram illustrating a control system 400 implementing a hydrogen and/or radiation hindering fiber optic conduit 404 having one or more optical fibers in a down-hole environment 408. In this example, control system 400 includes a controller 402 that is capable of monitoring one or more parameters associated with down-hole environment 408. Controller 402 can comprise, for example, any combination of hardware, software, and/or firmware that is capable of performing a desired functionality.

In various embodiments, one or more optical fibers are installed within fiber optic conduit 404. In some embodiments, the structure and function of conduit 404 can be substantially similar to the structure and function of conduits 200 and 300 of FIGS. 2 and 3, respectively. In other embodiments, the structure and function of conduit 404 can be substantially similar to the structure and function of fiber optic cable 100 of FIG. 1. The one or more optical fibers within fiber optic conduit 404 may transmit optical signals between sensors 406 and controller 402. In other embodiments, the one or more of optical fibers can comprise a distributed sensor that is capable of monitoring, for example, a temperature profile of down-hole environment 408, a strain, or a combination of these or other parameters. In this particular embodiment, down-hole environment 408 includes the presence of hydrogen and a relatively high temperature. In some cases, the relatively high temperatures in the down-hole well can exceed approximately 100° C.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A fiber optic conduit for use in a hostile environment, comprising:

a hydrogen barrier shell disposed outwardly from an inner axial tube, the hydrogen barrier shell comprising a material capable of reducing hydrogen permeation through the fiber optic conduit and a thickness of at least approximately one-thousandth of an inch, the inner axial tube capable of receiving one or more optical fibers; and an outer axial tube disposed outwardly from the hydrogen barrier shell and comprising a corrosion resistant material.

2. The fiber optic conduit of claim 1, wherein the hydrogen barrier shell adheres to the inner axial tube through an interference fit.

3. The fiber optic conduit of claim 1, wherein the hydrogen barrier shell comprises a wickable conductor that has been passed through a molten bath.

4. The fiber optic conduit of claim 1, wherein the hydrogen barrier shell is capable of conveying an electrical signal.

5. The fiber optic conduit of claim 1, wherein the material capable of reducing hydrogen permeation through the fiber optic cable is selected from the group consisting of carbon, silicon, germanium, tin, lead, and gold.

6. The fiber optic conduit of claim 1, wherein the hydrogen barrier shell comprises a material capable of reducing ionizing radiation flux intensity through the fiber optic conduit.

7. The fiber optic conduit of claim 6, wherein the material capable of reducing ionizing radiation flux intensity through the fiber optic cable is selected from the group consisting of bismuth, antimony, thallium, indium, arsenic, aluminum, boron, and lead.

8. The fiber optic conduit of claim 1, wherein the hydrogen barrier shell substantially encapsulates the inner axial tube.

9. The fiber optic conduit of claim 1, wherein the hydrogen barrier shell is substantially free from relying on the inner axial tube for mechanical integrity.

10. The fiber optic conduit of claim 1, wherein the outer axial tube is operable to form a hydrostatic pressure boundary for the fiber optic conduit.

11. A method of forming a fiber optic conduit capable of being used in a hostile environment, the method comprising:

forming a hydrogen barrier shell disposed outwardly from an inner axial tube, the hydrogen barrier shell comprising a material capable of reducing hydrogen permeation through the fiber optic conduit and a thickness of at least approximately one-thousandth of an inch, the inner axial tube capable of receiving one or more optical fibers; and forming an outer axial tube disposed outwardly from the hydrogen barrier shell and operable to form a hydrostatic pressure boundary for the fiber optic conduit.

12. The method of claim 11, wherein forming the hydrogen barrier shell comprises:

forming a conductive layer disposed outwardly from the inner axial tube, the conductive layer comprising a wickable conductor; and after forming the conductive layer, passing the conductive layer through a molten bath comprising a material capable of reducing hydrogen permeation through a fiber optic conduit, wherein the wickable conductor operates to convey the material of the molten bath into voids of the conductive layer by a wicking action.

13. The method of claim 11, wherein forming the hydrogen barrier shell comprises:

forming a barrier layer comprising a material capable of reducing hydrogen permeation through the fiber optic conduit; and after forming the barrier layer, passing the combination of the inner axial tube and the barrier layer through a swage die to form an interference fit between the barrier layer and the axial tube.

14. The method of claim 11, wherein the hydrogen barrier shell substantially encapsulates the axial tube.

15. The method of claim 11, wherein the hydrogen barrier shell is substantially free from relying on the inner axial tube for mechanical integrity.

16. The method of claim 11, wherein the hydrogen barrier shell adheres to the inner axial tube through an interference fit.

17. A fiber optic conduit for use in a hostile environment, comprising:

a hydrogen barrier shell disposed outwardly from an inner axial tube, the hydrogen barrier shell comprising a material capable of reducing hydrogen permeation through the fiber optic conduit and operable to form a cylindrical covering substantially around an outer surface of the inner axial tube, wherein at least a portion of the hydrogen barrier shell adheres to at least a portion of the inner axial tube through an interference fit; and an outer axial tube disposed outwardly from the hydrogen barrier shell and comprising a corrosion resistant material.

18. The fiber optic conduit of claim 17, wherein the hydrogen barrier shell comprises a thickness of at least approximately one-thousandth of an inch.

19. The fiber optic conduit of claim 17, wherein the hydrogen barrier shell is substantially free from relying on the inner axial tube for mechanical integrity.

20. The fiber optic conduit of claim 17, wherein the hydrogen barrier shell is capable of reducing radiation permeation through the fiber optic conduit.

* * * * *